United States Patent Office 3,406,359
Patented Oct. 15, 1968

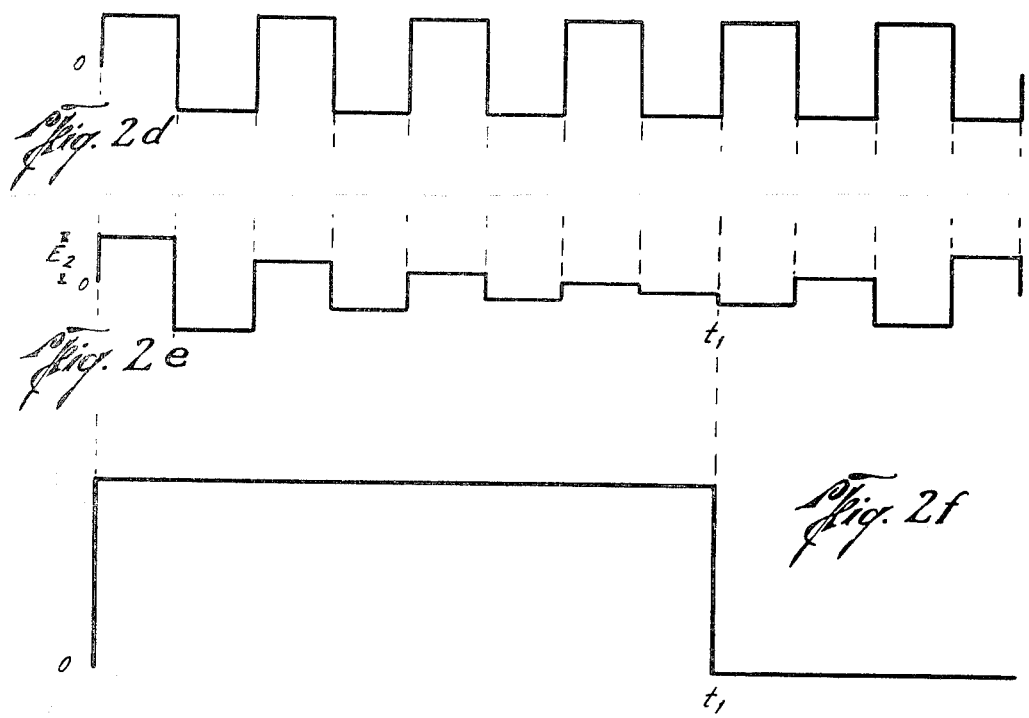
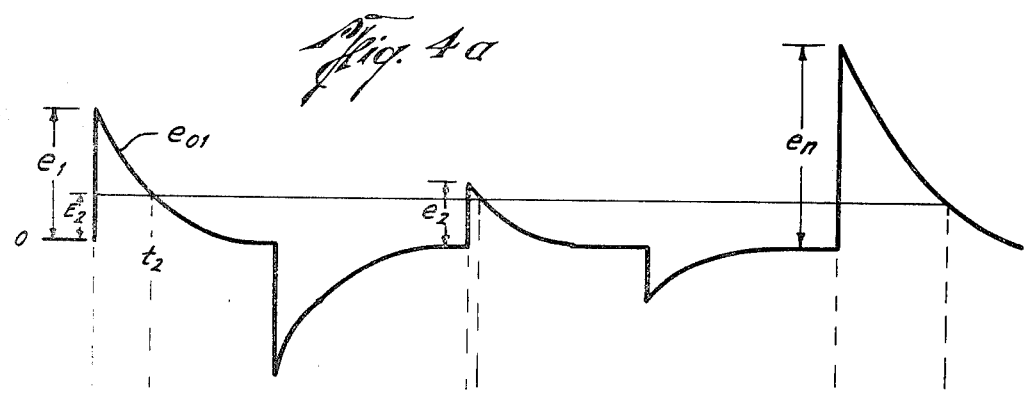
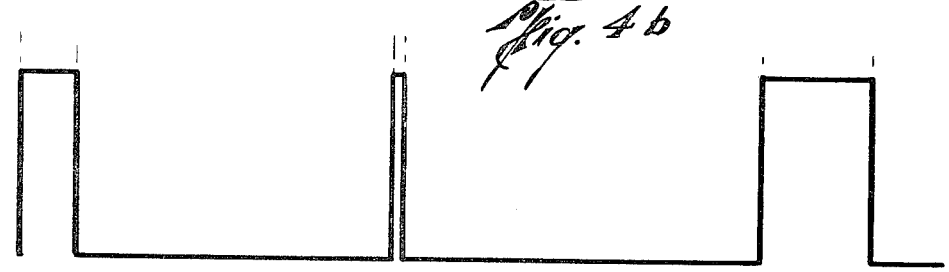

3,406,359
METHODS AND APPARATUS FOR COMPUTING A FUNCTION OF SAMPLED WELL LOGGING MEASUREMENTS DERIVED FROM MULTIPLE INVESTIGATING DEVICES
Wilbur C. Welz, Houston, Tex., and Jimmy G. Lee, Clamart, France, assignors, by mesne assignments, to Schlumberger Technology Corporation, Houston, Tex., a corporation of Texas
Filed Dec. 15, 1965, Ser. No. 514,036
14 Claims. (Cl. 324—1)

ABSTRACT OF THE DISCLOSURE

In accordance with an illustrative embodiment of the invention, a technique for computing a function of well logging measurements derived from a plurality of downhole investigating apparatus is disclosed. The well logging measurements are sampled and supplied to a computing means on a time sharing basis. The computing means utilizes time domain techniques wherein a chopper means switches between a generated time function signal and the well logging measurements to produce a chopped output signal. In another form, the chopper means switches between a constant amplitude signal and well logging measurements which have been differentiated. The chopped output signal is then compared in phase with the signal which energizes the chopper means to produce a pulse whose pulse width is representative of a given function of the well logging measurements. The output signals from the computing means are then separated by a switching means which is synchronized with the sampling operation.

---

Figure 1:
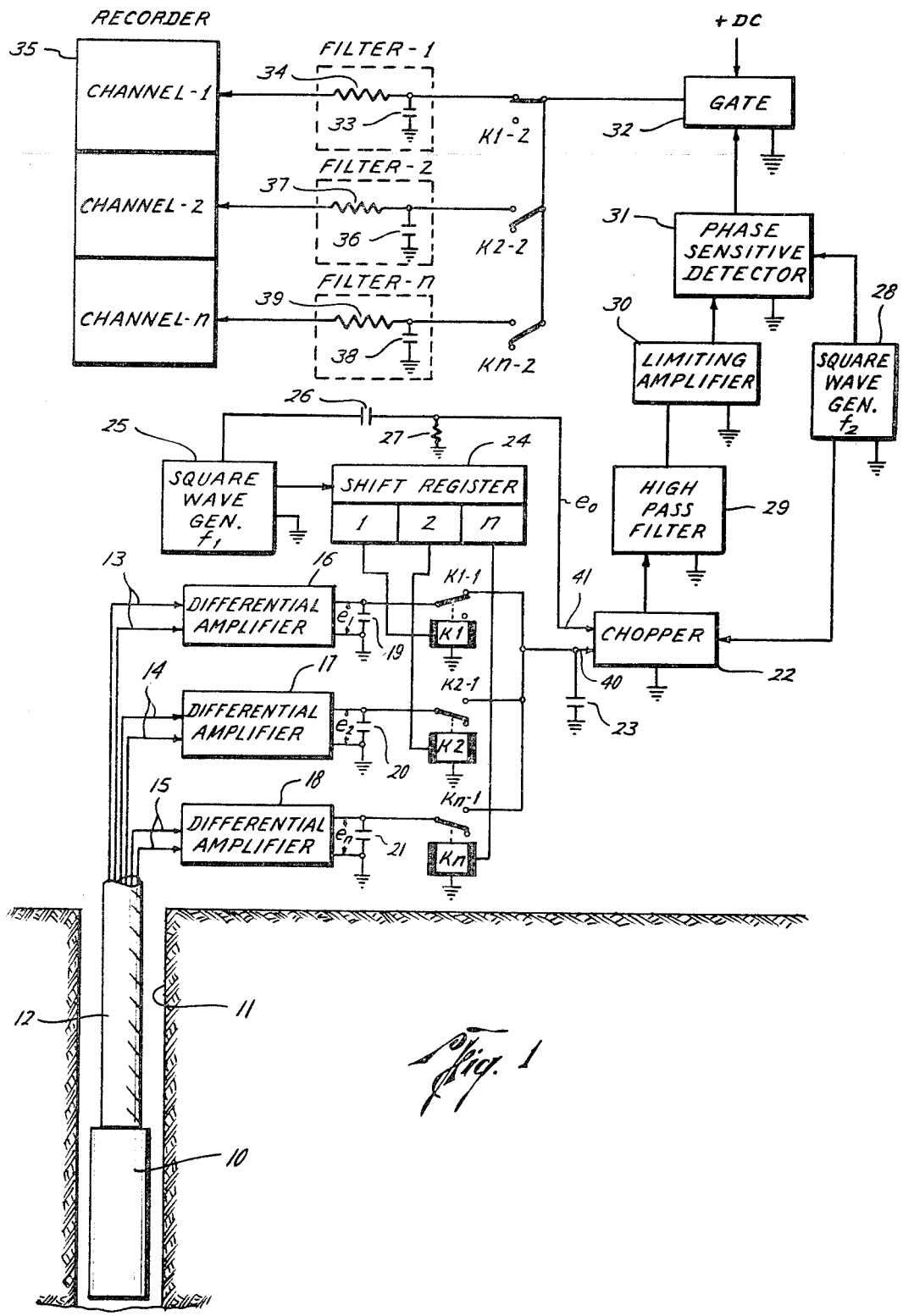
Figure 2A:
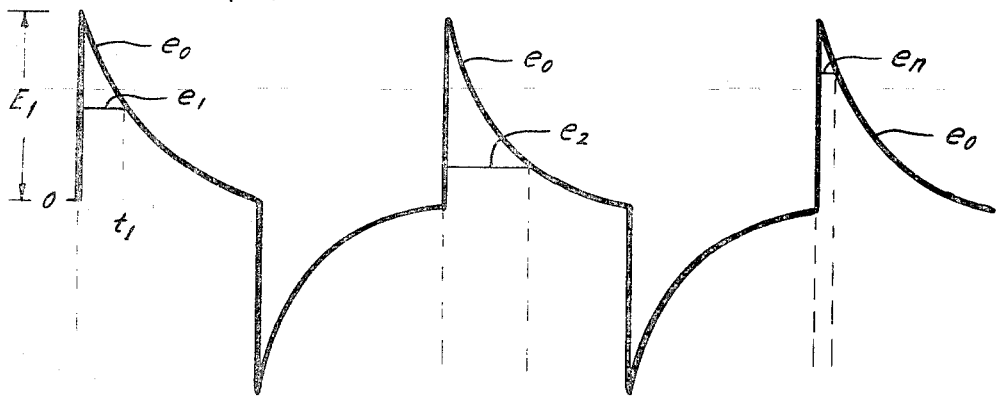
Figure 2B:
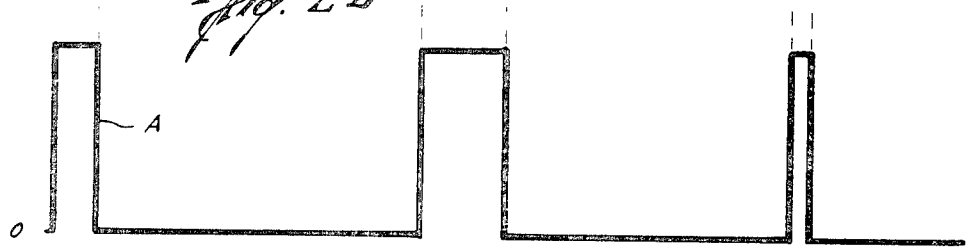
Figure 2C:
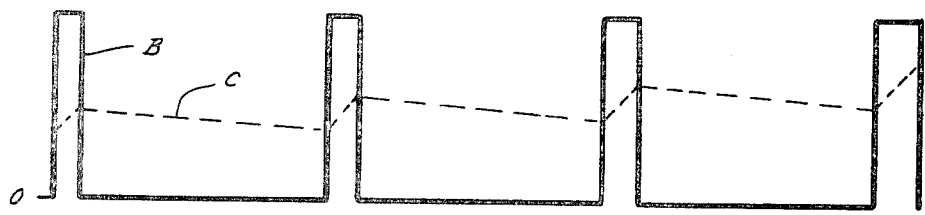

This invention relates to methods and apparatus for obtaining indications of well logging measurements derived from the logging of a borehole drilled into the earth wherein different types of investigating apparatus are utilized in the logging of the earth formations surrounding the borehole.

When investigating the earth formations surrounding a borehole, it is sometimes desirable to utilize several different investigating devices to provide a more complete picture of the earth formations surrounding the borehole. It is also desirable to obtain the well logging measurements from the different investigating devices during one trip into the borehole in order to save time and expense and insure proper depth correlation of the various well logging measurements made from the different investigating devices. Therefore, a tool lowered into a borehole on the end of a cable might contain several different devices for the investigation of the surrounding earth formations.

It is sometimes desirable in the logging of earth formations surrounding a borehole to convert a well logging measurement signal from its original form to some alternate form. In some cases, it becomes necessary to convert a plurality of well logging measurement signals from different devices to the same alternate form, e.g. a logarithmic or reciprocal form. In this case, it would be desirable to apply all of the well logging signals from the different investigating devices to one accurate form converting or function forming device.

The well logging measurements from any given device taken throughout the length of the borehole may have very large variations in magnitude due to wide variations in the composition of the surrounding earth formations. It is desirable to accurately record all of the well logging measurements ranging from extremely small signals to extremely large signals. However, if a linear recording device were utilized which could record extremely high magnitudes, the extremely low magnitudes might not be recorded with a sufficient degree of detail. In other words, the resolution of the recorded data decreases as the range increases.

One manner in which widely varying well logging measurements can be accurately determined at low magnitudes by a recording device so that there will not be such a wide variation in magnitude applied thereto is by compressing the scale, thus providing a greater resolution at low magnitudes. One manner of compressing the scale is to provide a signal to the recording device which is the logarithm of the well logging measurements.

If a logarithmic scale is used, percentage-type errors in the recorded measurements due to drifts in the investigating or recording apparatus can easily be corrected by merely sliding the scale of the recording device by the amount of error. In other words, a certain percent of error will cause a shift throughout a logarithmic scale by the same amount. In addition, it is desirable sometimes to combine the signals from several different investigating devices by multiplication or division. This combination process is frequently made sufficiently easier if the well logging measurements are in the form of logarithms.

One manner of providing the logarithm of widely varying well logging signals is to utilize diodes having logarithmic characteristics. However, it is sometimes difficult to always obtain good accuracy using these diodes due to environmental changes in the diodes, and expensive temperature regulated ovens must sometimes be utilized to maintain good accuracy.

One manner of investigating the earth formations surrounding the borehole is to obtain a log of the resistivity of the earth formations surrounding the borehole. However, some borehole investigating devices provide logs of the conductivity of the surrounding earth formations as, for example, the induction logging apparatus shown in U.S. Patent No. 3,147,429 granted to J. H. Moran on Sept. 1, 1964. In order to obtain earth formation resistivity values from these conductivity logs, the reciprocal of the conductivity values must be taken. If the logarithm of the resistivity logs is also to be obtained, this would normally require two separate operations. It would thus be desirable to simplify this operation.

When utilizing several different well logging devices at the same time to investigate the surrounding earth formations, it may be desirable to convert some or all of the well logging measurements from the different well logging devices to logarithmic functions of such measurements. It would be desirable in this connection to provide one logarithmic converter having a large dynamic range and which would convert a plurality of well logging measurements from different well logging devices. By utilizing only one logarithmic converter for several different logging devices, a great amount of space and expense would be saved.

However, a problem arises when using one converter for well logging measurements made from different investigating devices in that the ground reference potentials for different well logging devices are not always the same. Thus, a single logarithmic converter for converting the well logging measurements from several different well logging devices should be able to supply a common ground reference potential for the well logging measurements from each of the different well logging devices.

It is an object of this invention, therefore, to provide new and improved methods and apparatus for obtaining indications of well logging measurements made with different earth formation investigating devices wherein the well logging measurements can be passed through a single function forming apparatus and subsequently separated into components corresponding to the measurements obtained from the different investigating devices.

It is another object of the invention to provide new and improved methods and apparatus for taking the logarithm of the reciprocal of well logging measurements of the reciprocal of well logging measurements by a single operation.

It is still another object of the invention to provide new and improved method and apparatus for converting well logging measurements obtained from several different well logging devices to logarithmic functions of such measurements.

It is still another object of the invention to provide new and improved methods and apparatus for converting well logging measurements made by several different well logging devices into logarithmic functions of such measurements wherein only one converting apparatus is utilized for all of the different well logging measurements.

It is still another object of the invention to provide new and improved methods and apparatus for converting a plurality of widely varying direct-current signals to logarithmic functions of each of such direct-current signals wherein the converting apparatus has a large dynamic range.

It is still another object of the invention to provide new and improved methods and apparatus for accurately converting a plurality of widely varying linear direct-current input signals to a plurality of output signals which vary as the logarithm of each of the input signals, without relying on the accuracy or characteristics of non-linear devices.

In accordance with the present invention, methods and apparatus for processing measurements of at least one characteristic of earth formations traversed by a borehole wherein different apparatus for investigating the earth formations surrounding the borehole are utilized, comprises providing well logging measurements from at least two different apparatus for investigating the earth formations surrounding the borehole. The invention further comprises sampling the well logging measurements from the different investigating apparatus at given intervals of time, the well logging measurements from each different investigating apparatus being sampled during a different interval of time. The invention further comprises computing a given function of each sampled well logging measurement during said given intervals of time and switching, in synchronism with the sampling operation, the computed well logging measurements to separate utilization means so that each utilization means will receive computed well logging measurements derived from a separate investigating apparatus.

In one suitable form of the invention, a timing signal which is utilized to control the sampling operation is converted to a signal whose amplitude varies with time in accordance with a given mathematical function. This function signal is then compared with the sampled well logging measurements to produce the computed well logging measurements. In another form, the sampled well logging measurements are chopped in response to the timing signal and converted to a time function signal whose amplitude varies with time in accordance with a given mathematical relationship. This time function signal is then compared with another reference signal to provide the computed well logging measurements. In any event, well logging measurements are many times supplied to the surface of the earth on separate conductor pairs. Thus, in another form of the invention, these well logging measurements are referenced to a given reference potential.

For a better understanding of the present invention, together with other and further objects thereof, reference is had to the following description taken in connection with the accompanying drawings, the scope of the invention being pointed out in the appended claims.

Referring to the drawings:

FIG. 1 illustrates a tool having a plurality of well logging investigating devices for making well logging measurements in a borehole, together with a schematic diagram of the apparatus for converting the well logging measurements made from the plurality of well logging devices to signals representative of the logarithm of the reciprocal of the well logging measurements.

FIGS. 2(a)–2(f) illustrate the wave shapes of the signals at different points in the FIG. 1 apparatus.

Figure 3:
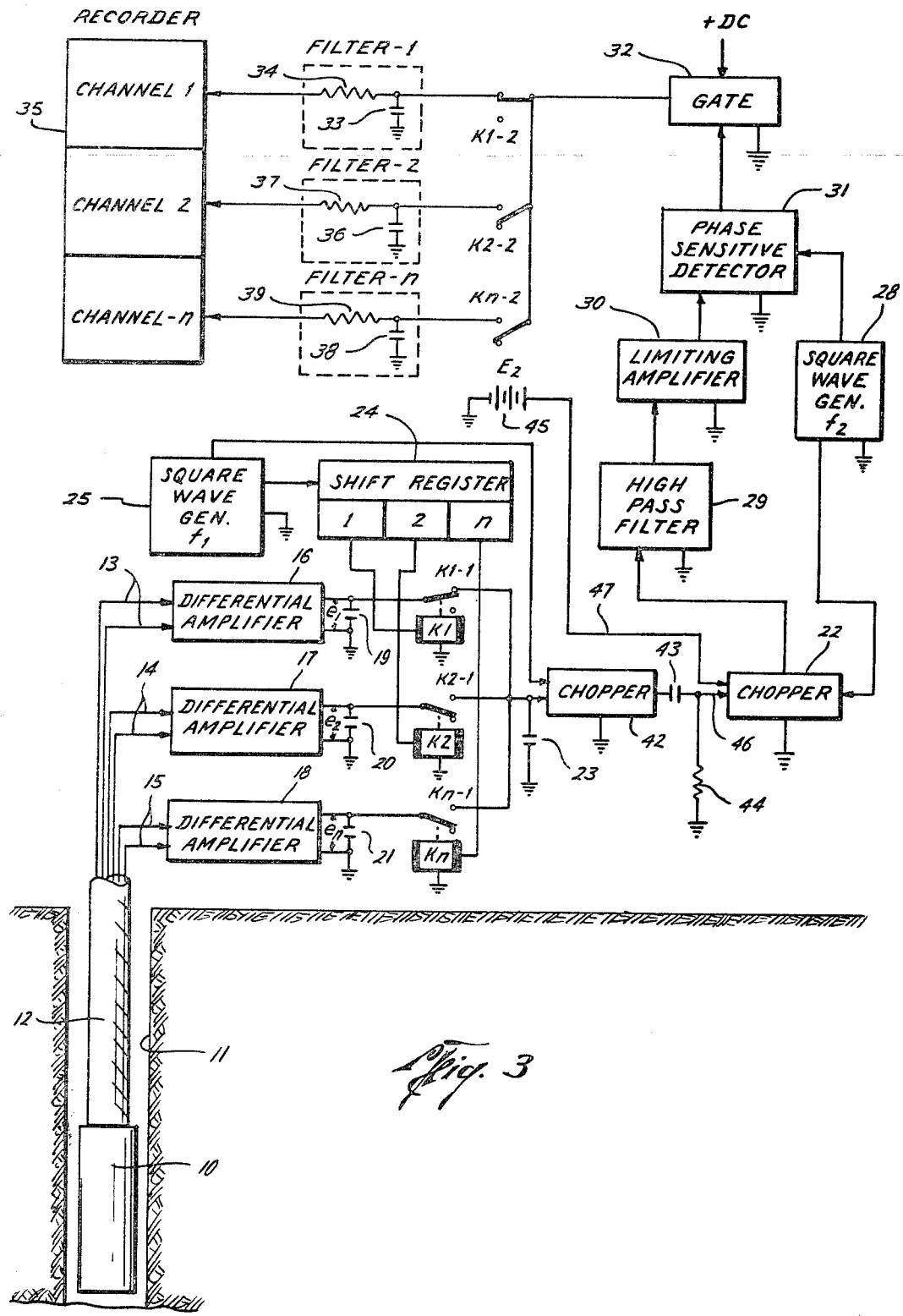

FIG. 3 illustrates another embodiment of the apparatus of FIG. 1 wherein the well logging measurements are converted to signals representative of the logarithm of the well logging measurements.

FIGS. 4(a) and 4(b) illustrate the wave shapes of the signals at different points in the FIG. 3 apparatus.

Referring now to FIG. 1, there is shown a tool 10 within a borehole 11 adapted for investigating the earth formations surrounding the borehole 11. The tool 10 includes in this case several different investigating devices which use different methods of investigation, as well as different depths of investigation. As an example, the tool 10 could include an induction logging system as shown in U.S. Patent No. 3,147,429 granted to J. H. Moran on Sept. 1, 1964, an electrode system as shown in Patent No. 3,031,612 granted to M. F. Easterling on Apr. 24, 1962, and an electrode system as shown in U.S. Patent No. 3,132,298 granted to H. G. Doll et al. on May 5, 1964. The tool 10 could also include various other types of investigating apparatus.

An armored multi-conductor cable 12 supports the tool 10 within the borehole 11 and is raised and lowered in and out of the borehole by a suitable cable reeling device (not shown) at the surface of the earth. The well logging measurements made by the different devices within tool 10 are supplied to the surface of the earth by conductor pairs 13, 14 and 15 which pass through armored multi-conductor cable 12. Thus conductor pair 13 will supply the well logging measurements made by a first well logging investigating apparatus, conductor pair 14 will supply the well logging measurements made by a second well logging investigating apparatus, and conductor pair 15 will supply well logging measurements made from a third well logging investigating apparatus.

Conductor pair 13 is connected to the input of a differential amplifier 16; conductor pair 14 is connected to the input of a differential amplifier 17; and conductor pair 15 is connected to the input of a differential amplifier 18. The output from differential amplifier 16 is connected across a capacitor 19, one side of capacitor 19 being connected to ground. The other side of capacitor 19 is connected to the common terminal of a relay operated switch K1–1 operated by a relay solenoid K1.

The output from differential amplifier 17 is connected across a capacitor 20, one side of which is connected to ground. The other side of capacitor 20 is connected to the common terminal of a relay operated switch K2–1 operated by a relay solenoid K2. The output from differential amplifier 18 is connected across a capacitor 21, one side of which is connected to ground. The other side of capacitor 21 is connected to the common terminal of a relay operated switch K$n$–1 operated by a relay solenoid K$n$. The normally open contacts of switches K1–1, K2–1, and K$n$–1 are connected to one input of an electronic chopper 22 via a conductor 40, and to one side of a capacitor 23, the other side of capacitor 23 being connected to ground.

The relays K1, K2, and K$n$ are energized by the stages 1, 2, and $n$ respectively of a shift register 24. The other side of relays K1, K2, and K$n$ are connected to ground. The shift register 24 is driven by a square wave generator 25 which supplies a square wave signal at frequency $f_1$. An output from square wave generator 25 is also connected to one side of a capacitor 26, the other side thereof being connected through a resistor 27 to ground, and to the second input to chopper 22 via conductor 41. Chopper 22 is driven by a square wave generator 28, which supplies a square wave signal at frequency $f_2$, which frequency $f_2$ is much greater than frequency $f_1$.

The output from chopper 22 is supplied to the input of a high pass filter 29 adapted to pass the frequency $f_2$ and block the frequency $f_1$. The output from high pass filter 29 is supplied to the input of a limiting amplifier 30 which amplifies the applied input signal, and then limits it to a given voltage level on both the positive and negative portions. The output from limiting amplifier 30 is supplied to the input of a phase sensitive detector 31, the phase reference signal to phase sensitive detector 31 being supplied from square wave generator 28. The output from phase sensitive detector 31 is supplied to the control terminal of a gate circuit 32, to which also is supplied a positive DC signal. The output from gate circuit 32 is supplied to the common terminal of switches K1–2, K2–2, and K$n$–2, which switches K1–2, K2–2, and K$n$–2 are operated by the relay solenoids K1, K2, and K$n$ respectively.

The normally open contact of switch K1–2 is connected to one side of a capacitor 33 and to one side of a resistor 34. The other side of capacitor 33 is connected to ground and the other side of resistor 34 is connected to the input of channel 1 of a recorder 35. The normally open contact of switch K2–2 is connected to one side of a capacitor 36 and to one side of a resistor 37. The other side of capacitor 36 is connected to ground and the other side of resistor 37 is connected to the input of channel 2 of the recorder 35. The normally open contact of switch K$n$–2 is connected to one side of a capacitor 38 and to one side of a resistor 39. The other side of capacitor 38 is connected to ground and the other side of resistor 39 is connected to the input of channel $n$ of the recorder 35.

Now concerning the operation of the apparatus of FIG. 1, the various investigating devices within tool 10 transmit the well logging measurements through conductor pairs 13, 14 and 15. Since the reference potentials for each of the investigating devices may be different, a common ground reference potential must be provided for the converter. Differential amplifiers 16, 17 and 18 supply the common ground reference potential, shown in FIG. 1 as the standard ground symbol. To accomplish this, differential amplifiers 16, 17 and 18 supply output signals proportional to the difference in potential between the potentials of each conductor of the respective conductor pair. Thus the output signals from differential amplifiers 16, 17 and 18 will have a potential difference proportional to the potential difference between the conductors on the respective input conductor pairs. Since one of the output leads from each of differential amplifiers 16, 17 and 18 is connected directly to ground, the well logging measurements from differential amplifiers 16, 17 and 18 will have a common ground reference potential.

The apparatus comprising relays K1, K2, and K$n$, and shift register 24 driven by square wave generator 25 is utilized to sample the well logging measurement outputs from each of differential amplifiers 16, 17, and 18 at different given intervals of time, which different intervals of time are determined by the frequency $f_1$ of square wave generator 25. The frequency $f_1$ of square wave generator 25 can be set at any desired level, for example, 50 cycles. The square wave generator 25 drives the shift register 24 so that shift register 24 will shift once at every cycle from square wave generator 25, i.e. 50 shifts per second. Shift register 24 thus energizes the relays K1, K2 and K$n$ at these given intervals of time as determined by the frequency $f_1$ of square wave generator 25. Thus, during the first cycle, the 1 stage of shift register 24 energizes relay K1; during the second cycle, the 2 stage of shift register 24 energizes relay K2; during the third cycle from square wave generator 25, the $n$ stage of shift register 24 energizes relay K$n$; and during the fourth cycle from square wave generator 25, the 1 stage of shift register 24 again energizes relay K1, etc. The negative portion of the pulses from square wave generator 25 initiates the switching operation.

Thus, switch K1–1 samples the well logging measurement from differential amplifier 16 during the first cycle, switch K2–1 samples the well logging measurement from differential amplifier 17 during the second cycle, and switch K$n$–1 samples the well logging measurement from differential amplifier 18 during the third cycle of operation. These sampled signals are supplied to the chopper 22. The capacitors 19, 20 and 21 have values of capacitance so as to accurately follow the well logging measurements from differential amplifiers 16, 17 and 18, and provide a low impedance input to chopper 22. The values of capacitors 19, 20 and 21 may be, for example, 10 microfarads. The capacitor 23 on the input to chopper 22 is utilized to smooth out the switching spikes caused by switches K1–1, K2–1, and K$n$–1, and can have a value of, for example, .01 microfarad.

Square wave generator 25 also supplies a square wave signal to the differentiating network comprising capacitor 26 and resistor 27, which converts the square wave signal to a differentiated square wave signal having a very fast rise time and an exponential decay characteristic with a long time constant. For example, if frequency $f_1$ is 50 cycles, resistor 27 could be 15K ohms and capacitor 26 could be .05 microfarad. The square wave generator 28 operates at a frequency $f_2$ much greater than the frequency $f_1$ of square wave generator 25 which could be, for example, 30 kc. The square wave signal from square wave generator 28 drives the chopper 22, which chops between the two applied input signals. Thus, chopper 22 allows the instantaneous potential on conductor 40 to pass through to high pass filter 29 during one-half of a cycle of the square wave signals from square wave generator 28, and allows the instantaneous potential on conductor 41 to pass through during the other one-half cycle. High pass filter 29 allows only the square wave difference signal, generated at the higher frequency $f_2$ of square wave generator 28 to pass through to limiting amplifier 30. Since high pass filter 29 includes a series capacitor, any DC voltage component of the chopped signal is removed by high pass filter 29.

Since the wall logging measurements on conductor pairs 13, 14 and 15 may have a very wide variation in voltage magnitude, the output signal from high pass filter 29 may also have very large voltage magnitudes when the difference between the voltages present on conductors 40 and 41 is great. These large voltages would be difficult to handle. To solve this problem, limiting amplifier 30 limits the peak-to-peak voltage from high pass filter 29 which is applied to phase sensitive detector 31 to a magnitude which is relatively easy to handle.

Phase sensitive detector 31 supplies a DC output voltage which is proportional to that portion of the signal from limiting amplifier 30 which is in phase with the phase reference signal from square wave generator 28. This DC voltage from phase sensitive detector 31 controls the gate 32. When the output voltage from phase sensitive detector 31 is positive, gate 32 supplies a constant current output. On the other hand, when the voltage from phase sensitive detector 31 is negative, gate 32 is shut off. Gate 32 could comprise any known type of circuit for performing this function, as for example, a Schmitt trigger circuit which supplies a positive output only when the input voltage is above zero volts.

The constant current output from gate 32 is supplied to one of the filter circuits, filter 1, 2, or $n$, the particular one depending on which relay K1, K2, or K$n$ is energized. Thus, it can be seen that relays K1, K2, and K$n$, when energized, connect the chopper 22 to one of the differential amplifiers 16, 17 and 18 and at the same time connect the gate 32 to the corresponding one of the filters, filter 1, 2 or $n$. Thus when relay K1 is energized, the switches K1–1 and K1–2 are switched to the normally open contact as shown in FIG. 1.

The output impedance from gate 32 is relatively low while gate 32 is on, in comparison to the resistance of resistors 34, 37 and 39 in combination with the internal resistance of the particular channel of recorder 35. During the time when gate 32 is off, the impedance looking into the output of gate 32 is very high, caused by a back-biased transistor, for example. Thus, it can be seen that the constant current output from gate circuit 32 will charge up the respective capacitor 33, 36 or 38 at a relatively fast rate. On the other hand, when gate 32 is shut off, the particular capacitor 33, 36 or 38 will have a relatively high impedance to discharge through, thus discharging at a relatively slow rate. This results in a substantially DC output current to recorder 35, the magnitude of which is proportional to the time interval that gate 32 is on. Since, as concerns each channel of recorder 35, the time that gate 32 is on is much less than the time that it is off, the faster charge-up by capacitors 33, 36, or 38 is required. Since the frequency $f_1$ of square wave generator 25 is constant, filters 1, 2 and $n$ provide an output signal whose current is proportional to the time interval that gate 32 is on. Thus, the magnitude of the input signal to each channel of recorder 25 will be proportional to the pulse width of the signal applied to the respective filter. As will be shown later, the time interval that gate 32 is on, is proportional to the logarithm of the reciprocal of the well logging measurements on conductor pairs 13, 14 and 15.

Now looking at FIG. 2, there are shown the wave shapes at different points in the apparatus of FIG. 1. The voltages $e_1$, $e_2$, and $e_n$ in FIG. 2($a$) represent the voltage outputs from differential amplifiers 16, 17 and 18 respectively. The differentiated square wave signal $e_0$ represents the voltage present on conductor 41. The pulses A of FIG. 2($b$) represent the time interval during which gate 32 is on. Looking at FIG. 2($a$) and 2($b$) in conjunction, it can be seen that the time interval during which gate 32 is on is equal to the time interval during which the particular well logging measurement $e_1$, $e_2$, or $e_n$ is of less magnitude than the differentiated square wave $e_0$. This pulse width is proportional to the logarithm of the reciprocal of the particular well logging measurement. The peak amplitude of the differentiated square wave signal $e_0$, designated $E_1$, is greater than the maximum possible amplitude of the well logging measurements $e_1$, $e_2$, or $e_n$. The relays K1, K2, and K$n$ are energized on the negative portion of the square wave output signal from square wave generator 25 so as to be in position during the positive portion of the differentiated square wave $e_0$ of FIG. 2($a$).

It would be desirable at this time to derive the mathematical relationship which shows that the pulse widths of the pulses of FIG. 2($b$) are proportional to the logarithm of the reciprocal of the well logging measurement. The equation for the positive portion of the differentiated waveform $e_0$ of FIG. 2($a$) is equal to $$e_0 = E_1 \epsilon^{-t/RC} \quad (1)$$

where $E_1$ is the maximum voltage of the differentiated square wave $e_0$, R is the resistance of resistor 27 in FIG. 1, and C is the capacitance of capacitor 26 of FIG. 1.

Taking the well logging measurement $e_1$ as an example, we know from FIG. 2($a$) that at time $t_1$, the voltage magnitude of the differentiated square wave $e_0$ is equal to the magnitude of the well logging measurement $e_1$. Substituting this into Equation 1, we have:

$$e_1 = E_1 \epsilon^{-t_1/RC} \quad (2)$$

Taking the logarithm of both sides of Equation 2 and rearranging, we have $$t_1 = RC(\log_\epsilon 10) \frac{E_1}{e_1} \quad (3)$$

Since R, C, and $E_1$ are constants, $t_1$ (the pulse width of the corresponding pulse in FIG. 2($b$)) is proportional to the logarithm of the reciprocal of the well logging measurement $e_1$. This same argument applies to the other well logging measurements, $e_2$ and $e_n$.

Looking now at FIG. 2($c$), there are shown the pulses representing the time intervals that gate 32 is on for any one channel of recorder 35, shown as waveform B. Thus, in the FIG. 1 embodiment, pulses shown in FIG. 2($c$) represent the first, fourth, seventh, and tenth pulses from gate 32. The pulse width of the pulses in FIG. 2($c$) are shown increasing progressively as time increases. The dotted line C in FIG. 2($c$) represents the current applied to recorder 35. It can be seen from FIG. 2($c$) that the capacitors 33, 36 and 38 charge-up at a fast rate during the time that gate 32 is on due to the fact that the output impedance from gate 32 is relatively low. During the time that gate 32 is off, the discharge rate is very slow since the capacitors 33, 36 and 38 have relatively high impedances to discharge through. Thus, it can be seen that the filters 1, 2 and $n$ provide a substantial DC current to recorder 35, which current is proportional to the logarithm of the reciprocal of the well logging measurements.

To explain the operation of phase sensitive detector 31, refer to FIGS. 2($d$ and $e$). FIG. 2($d$) represents the output pulses from square wave generator 28 and FIG. 2($e$) represents the output pulses from limiting amplifier 30. Since the square wave generator 28 drives the chopper 22, the output pulses from limiting amplifier 30 will have the same frequency $f_2$ as the square wave pulses from square wave generator 28. The voltage $E_2$ represents the maximum voltage which is applied to phase sensitive detector 31 due to the limiting action of limiting amplifier 30. The peak-to-peak voltage of the square wave signal of FIG. 2($e$) is proportional to the difference between the differentiated square wave signal $e_0$ and the particular well logging measurement $e_1$, $e_2$ or $e_n$, depending on the particular channel being sampled (up to the limiting voltage $E_2$).

As long as the voltage of the differentiated square wave signal $e_0$ is greater than the voltage of the particular well logging measurement $e_1$, $e_2$ or $e_n$, the square wave signal of FIG. 2($e$) will be in phase with the square wave signal from square wave generator 28, shown in FIG. 2($d$). However, as soon as the differentiated square wave voltage $e_0$ is less than the voltage of the well logging measurement $e_1$, $e_2$ or $e_n$, the phase of the square wave signal from limiting amplifier 30 will change by 180°. This point where the differentiated square wave voltage $e_0$ drops below the well logging measurement voltage is designated $t_1$ in FIG. 2($e$). From the time $t_1$, the output voltage from the limiting amplifier 30 shown in FIG. 2($e$) is out of phase with the square wave signal from square wave generator 28 shown in FIG. 2($d$).

Looking at FIG. 2($f$), there is shown the pulse representing the time interval that gate 32 is on. Since the output signal from limiting amplifier 30 shown in FIG. 2($e$) is in phase with the square wave signal from square wave generator 28 shown in FIG. 2($d$) until the time $t_1$, (the same time $t_1$ as in FIG. 2($a$ and $b$)), phase sensitive detector 31 will supply a positive DC voltage to gate 32 during this period of time. Thus, gate 32 will be on during this period of time, as shown in FIG. 2($f$). As soon as the signal from limiting amplifier 30 shown in FIG. 2($e$) becomes out of phase with the signal from square wave generator 28 shown in FIG. 2($d$), phase sensitive detector 31 will supply a negative DC voltage to gate 32, thus shutting gate 32 off. This is shown in FIG. 2($f$) at the time $t_1$, where the output current from gate 32 drops to zero. As stated previously, this time interval $0-t_1$ that gate 32 is on, is proportional to the logarithm of the reciprocal of the well logging measurements.

Looking now at FIG. 3, there is shown a second embodiment of the present invention. The FIG. 3 apparatus is adapted for taking the logarithm of a plurality of well logging measurements made with different well logging investigating apparatus. The elements in FIG. 3 that are identical with the same elements in FIG. 1 have the same reference numerals.

In the FIG. 3 embodiment, the normally open contacts of switches K1–1, K2–1, and Kn–1 are connected to one side of the capacitor 23, the other side being connected to ground in the same manner as in the FIG. 1 embodiment. However, in the FIG. 3 embodiment, the normally open contacts of the switches K1–1, K2–1, and Kn–1 are connected also to the input of a chopper 42, which is driven by the square wave signal from square wave generator 25 at the frequency $f_1$. The output of chopper 42 is connected to one side of a capacitor 43, the other side of capacitor 43 being connected through a resistor 44 to ground and to one input of the chopper 22 via conductor 46. Chopper 22 is driven by square wave generator 28 at the frequency $f_2$ in the same manner as in the FIG. 1 embodiment. The other input to chopper 22 is supplied from the positive terminal of a battery 45 having a voltage $E_2$ instead of from the differentiating network comprising resistor 27 and capacitor 26 of FIG. 1. The negative terminal of battery 45 is connected to ground. The remainder of the circuitry of FIG. 3 is identical with the circuitry of FIG. 1.

Therefore, it can be seen that the FIG. 3 embodiment differs from the FIG. 1 embodiment in that the well logging measurements from switches K1–1, K2–1, and Kn–1, instead of being supplied directly to chopper 22 in the FIG. 1 embodiment, are supplied to a chopper 42 driven by a square wave generator 25, the output from chopper 42 being supplied through a differentiating network comprising capacitor 43 and resistor 44 to chopper 22. Additionally the other input to chopper 22, instead of being supplied from square wave generator 25 and the differentiating circuit comprising capacitor 26 and resistor 27, is supplied from the constant voltage battery 45.

The operation of the FIG. 3 embodiment is similar to the operation of the FIG. 1 embodiment, except that in the FIG. 3 embodiment, the well logging measurements are chopped by chopper 42 at the frequency $f_1$ and the resulting square wave pulses are differentiated by capacitor 43 and resistor 44. Chopper 22 thus chops between the differentiated well logging measurements on conductor 46 and the constant voltage on conductor 47.

Looking at FIGS. 4(a) and 4(b), there are shown the wave shapes at different points in the FIG. 3 embodiment. FIG. 4(a) represents the input voltages on conductors 46 and 47 to chopper 22 and FIG. 4(b) represents the time interval when gate 32 is on. Since the output voltage from chopper 42 is proportional to the particular well logging measurement being supplied to chopper 42, the peak voltage of the differentiated square wave signal on conductor 46 is likewise proportional to the voltage magnitude of the well logging measurement. Thus it can be seen that the peak-to-peak amplitude of the differentiated square wave $e_{01}$ of FIG. 4(a) will vary in direct proportion to the magnitude of the well logging measurements while the voltage magnitude $E_2$ will remain constant for each of the well logging measurements.

The gate 32 will remain on for that period of time when the differentiated square wave signal $e_{01}$ is above the fixed voltage $E_2$ in the same manner as in the FIG. 1 embodiment. This is shown in FIG. 4(b). Thus, it can be seen from FIG. 4(b) that the greater the magnitude of the well logging measurements $e_1$, $e_2$ and $e_n$, the wider the pulse width of the pulses in FIG. 4(b) representing the time interval that gate 32 is on. The time interval that gate 32 in FIG. 3 is on, is proportional to the logarithm of the well logging measurements, as will be shown below.

To prove that the pulse width of the pulses in FIG. 4(b) are proportional to the logarithm of the particular well logging measurement, (in this case, $e_1$) we can write the relationship for the voltage of the differentiated square wave $e_0$ of FIG. 4(a) as $$e_{01}=e_1\epsilon^{-t/RC} \qquad (4)$$

where R is the resistance of resistor 44 and C is the capacitance of capacitor 43. At time $t_2$, Equation 4 can be written as $$E_2=e_1\epsilon^{-t_2/RC} \qquad (5)$$

where 0 to $t_2$ is the time interval in which $e_{01}$ is greater than $e_1$, and $E_2$ is the voltage of battery 45. Taking the logarithm of both sides of Equation 5, we arrive at the result $$t_2=RC(\log_e 10)\frac{e_1}{E_2} \qquad (6)$$

Since R, C, $E_2$ are constants, it is seen that the time interval $t_2$ that gate 32 is on, is proportional to the logarithm of the well logging measurement $e_1$. The same argument applies to the other well logging measurements $e_2$ and $e_n$.

The present invention may be used to provide other types of signal conversion for cases where a plurality of well logging devices are utilized simultaneously, and is not limited to the providing of logarithmic conversions. Other types of functions having time as one element could be supplied to chopper 22 besides the logarithmic function, and gate 32 would remain on for a time period proportional to that function. This could be accomplished by means of either the apparatus of FIGS. 1 or 3 depending on whether an inverse function is desired. That is to say, a separate function could be supplied to chopper 22 as in FIG. 1, or the well logging measurements could be formed into the desired function as in FIG. 3. For example, a function having a time characteristic proportional to the square, cube root, etc. could be utilized. Thus, the apparatus of FIGS. 1 and 3 has utility aside from the logarithmic functions shown, as well as with these functions.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of processing measurements of at least one characteristic of earth formations traversed by a borehole wherein different apparatus for investigating the earth formations surrounding the borehole are utilized, comprising:
    (a) providing well logging measurements from at least two different apparatus for investigating the earth formations surrounding the borehole;
    (b) generating a timing signal at a given frequency;
    (c) sampling the well logging measurements from the different investigating apparatus at given intervals of time in response to the timing signal, the well logging measurements from each different investigating apparatus being sampled during a different interval of time;
    (d) converting the timing signal to a function signal whose amplitude varies with time in accordance with a given mathematical function;
    (e) comparing the function signal with the sampled well logging measurements to produce computed well logging measurements which are representative of the given function of the well logging measurements; and
    (f) switching, in synchronism with the step of sampling, the computed well logging measurements to separate utilization means so that each utilization means will receive the computed well logging measurements derived from a separate investigating apparatus.

2. A system for processing measurements of at least one characteristic of earth formations traversed by a borehole wherein different apparatus for investigating the earth formations surrounding the borehole are utilized, comprising:
   (a) means for providing well logging measurements from at least two different apparatus for investigating the earth formations surrounding the borehole;
   (b) means for generating a timing signal at a given frequency;
   (c) sampling means responsive to the timing signal for sampling the well logging measurements from the different investigating apparatus at given intervals of time, the well logging measurements from each different investigating apparatus being sampled during a diffeernt interval of time;
   (d) means for converting the timing signal to a function signal whose amplitude varies with time in accordance with a given mathematical function;
   (e) means for comparing the sampled well logging measurements with the function signal to produce computed well logging measurements which are representative of the given function of the well logging measurements;
   (f) a separate utilization means adapted to be responsive to the computed well logging measurements corresponding to the measurements derived from the different investigating apparatus; and
   (g) first switching means for switching the computed well logging measurements from the computing means to different ones of the utilization means in synchronism with the sampling of the well logging measurements by the sampling means.

3. A system for processing measurements of at least one characteristic of earth formations traversed by a borehole wherein different apparatus for investigating the earth formations surrounding the borehole are utilized, comprising:
   (a) means for providing well logging measurements from a plurality of investigating apparatus, the measurements from at least two of the investigating apparatus being supplied on separate conductor pairs;
   (b) means for referencing the well logging measurements on the conductor pairs to a given reference potential;
   (c) sampling means for sampling the well logging measurements from the different investigating apparatus at given intervals of time, the well logging measurements from each different investigating apparatus being sampled during a different interval of time;
   (d) computing means responsive to the sampled well logging measurements for computing a given function of the sampled well logging measurements;
   (e) a separate utilization means adapted to be responsive to the computed well logging measurements corresponding to the measurements derived from the different investigating apparatus; and
   (f) first switching means for switching the computed well logging measurements from the computing means to different ones of the utilization means in synchronism with the sampling of the well logging measurements by the sampling means.

4. A system for processing measurements of at least one characteristic of earth formations traversed by a borehole wherein different apparatus for investigating the earth formations surrounding the borehole are utilized, comprising:
   (a) means for providing well logging measurements from at least two different apparatus for investigating the earth formations surrounding the borehole;
   (b) sampling means for sampling the well logging measurements from each different investigating apparatus at given intervals of time, the well logging measurements from each different investigating apparatus being sampled during a different interval of time;
   (c) first means for generating a signal having a time characteristic adapted to be representative of a logarithmic function;
   (d) means responsive to the sampled well logging measurements and the time characteristic signal for providing a computed output signal having a time characteristic representative of the logarithm of the reciprocal of the well logging measurements;
   (e) a separate utilization means adapted to be responsive to the computed well logging measurements corresponding to the measurements derived from the different investigating apparatus;
   (f) first switching means for switching the computed well logging measurements from the computing means to different ones of the utilization means in synchronism with the sampling of the well logging measurements by the sampling means so as to separate the time characteristic output signal into separate components, each component having a time characteristic representative of the logarithm of the reciprocal of the well logging measurements from one of the investigating apparatus; and
   (g) means coupled to the first switching means for substantially smoothing each component of the time characteristic output signal so as to supply a substantially direct current signal for each component to the utilization means, the magnitude of each direct current signal being representative of the logarithm of the reciprocal of the well logging measurement from said one of the investigating apparatus.

5. A system for processing measurements of at least one characteristic of earth formations traversed by a borehole wherein different apparatus for investigating the earth formations surrounding the borehole are utilized, comprising:
   (a) means for providing well logging measurements from at least two different apparatus for investigating the earth formations surrounding the borehole;
   (b) sampling means operating at a first frequency for sampling the well logging measurements from the different investigating apparatus at given intervals of time, the well logging measurements from each different investigating apparatus being sampled during a different interval of time;
   (c) first means for generating a signal having a time characteristic representative of a desired function;
   (d) generator means for providing a signal at a second frequency;
   (e) chopper means responsive to the signal at the second frequency for chopping between the sampled well logging measurements and the time characteristic signal and providing a chopped output signal;
   (f) output means responsive to the phases of the signal at the second frequency and the chopped output signal from the chopper means for providing signals representative of a computed function of the sampled well logging measurements;
   (g) a separate utilization means adapted to be responsive to the computed well logging measurements corresponding to the measurements derived from the different investigating apparatus; and
   (h) switching means for switching the computed well logging measurements from the computing means to different ones of the utilization means in synchronism with the sampling of the well logging measurements by the sampling means.

6. The system of claim 5 in which the output means includes:
   (1) phase sensitive means responsive to the phases of the signal at the second frequency and the chopped output signal from the chopper means for providing an output signal indicative of the phase relationship thereof; and
(2) means responsive to the output signal from the phase sensitive means for providing said computed output signal, said computed output signal having a time characteristic representative of the computed function of the well logging measurements.

7. A system for processing measurements of at least one characteristic of earth formations traversed by a borehole wherein different apparatus for investigating the earth formations surrounding the borehole are utilized, comprising:
(a) means for providing well logging measurements from at least two different apparatus for investigating the earth formations surrounding the borehole;
(b) sampling means for sampling the well logging measurements from the different investigating apparatus at given intervals of time, the well logging measurements from each different investigating apparatus being sampled during a different interval of time;
(c) generator means for generating a square wave signal at a first frequency;
(d) first switching means coupled to the means for providing the well logging measurements and responsive to the signal at the first frequency for switching between the well logging measurements derived from each of the different well logging apparatus so as to sample the well logging measurements from each investigating apparatus at different intervals of time;
(e) first means for differentiating the square wave signal at the first frequency;
(f) second means responsive to the sampled well logging measurements and the differentiated square wave signal at the first frequency for providing a computed output signal representative of a logarithmic function of the well logging measurements;
(g) a separate utilization means adapted to be responsive to the computed well logging measurements corresponding to the measurements derived from the different investigating apparatus; and
(h) second switching means responsive to the square wave signal for switching the computed well logging measurements from the computing means to different ones of the utilization means in synchronism with the sampling of the well logging measurements by the first switching means.

8. A system for processing measurements of at least one characteristic of earth formations traversed by a borehole wherein different apparatus for investigating the earth formations surrounding the borehole are utilized, comprissing:
(a) means for providing well logging measurements from at least two different apparatus for investigating the earth formations surrounding the borehole;
(b) sampling means for sampling the well logging measurements from the different investigating apparatus at given intervals of time, the well logging measurements from each different investigating apparatus being sampled during a different interval of time;
(c) means for generating a constant amplitude signal;
(d) means responsive to the sampled well logging measurements for providing a signal having a time characteristic adapted to be representative of a given function of the well logging measurements;
(e) generator means for providing a signal at a second frequency;
(f) chopper means responsive to the signal at the second frequency for chopping between the time characteristic signal and the constant amplitude signal to provide a chopped output signal;
(g) output means responsive to the phases of the signal at the second frequency and the chopped output signal from the chopper means for providing computed signals representative of the function of the well logging measurements;
(h) a separate utilization means adapted to be responsive to the computed well logging measurements corresponding to the measurements derived from the different investigating apparatus; and
(i) switching means for switching the computed well logging measurements from the computing means to different ones of the utilization means in synchronism with the sampling of the well logging measurements by the sampling means.

9. The system of claim 8 in which the output means includes:
(1) phase sensitive means responsive to the phases of the signal at the second frequency and the chopped output signal from the chopper means for providing an output signal indicative of the phase relationship thereof; and
(2) means responsive to the output signal from the phase sensitive means for providing an output signal having a time characteristic representative of the logarithm of the well logging measurements.

10. A method of procesing measurements of at least one characteristic of earth formations traversed by a borehole wherein different apparatus for investigating the earth formations surrounding the borehole are utilized, comprising:
(a) providing well logging measurements from at least two different apparatus for investigating the earth formations surrounding the borehole;
(b) sampling the well logging measurements from the different investigating apparatus at given intervals of time, the well logging measurements from each different investigating apparatus being sampled during a different interval of time;
(c) computing a given function of each sampled well logging measurement during said given intervals of time, said step of computing including the steps of:
(1) generating a time function signal whose amplitude varies with time in accordance with said given function;
(2) switching between the time function signal and the sampled well logging measurements at a frequency substantially greater than the frequency at which the well logging measurements are sampled to produce a chopped output signal;
(3) generating a signal having a time characteristic representative of the function of the well logging measurements in response to the chopped output signal; and
(d) switching, in synchronism with the step of sampling, the computed well logging measurements to separate utilization means so that each utilization means will receive the computed well logging measurements derived from a separate investigating apparatus.

11. A method of processing measurements of at least one characteristic of earth formations traversed by a borehole wherein different apparatus for investigating the earth formations surrounding the borehole are utilized, comprising:
(a) providing well logging measurements from at least two different apparatus for investigating the earth formations surrounding the borehole;
(b) sampling the well logging measurements from the different investigating apparatus at given intervals of time, the well logging measurements from each different investigating apparatus being sampled during a different interval of time;
(c) computing a given function of each sampled well logging measurement during said given intervals of time, said step of computing including the steps of:
(1) generating a constant amplitude signal;

(2) generating a first signal in response to the sampled well logging measurements whose amplitude varies with time in accordance with said given function of the well logging measurements;
(3) switching between the constant amplitude signal and the first signal at a frequency substantially greater than the frequency at which the well logging measurements are sampled to produce a chopped output signal;
(4) generating a pulse width is representative of the function of the well logging measurements in response to the chopped output signal; and
(d) switching, in synchronism with the step of sampling, the computed well logging measurements to separate utilization means so that each utilization means will receive the computed well logging measurements derived from a separate investigating apparatus.

12. A method of processing measurements of at least one characteristic of earth formations traversed by a borehole wherein different apparatus for investigating the earth formations surrounding the borehole are utilized, comprising:
(a) providing well logging measurements from at least two different apparatus for investigating the earth formations surrounding the borehole;
(b) generating a timing signal at a given frequency;
(c) sampling the well logging measurements from the different investigating apparatus at given intervals of time in response to the timing signal, the well logging measurements from each different investigating apparatus being sampled during a different interval of time;
(d) chopping the sampled well logging measurements into square wave signals in response to the timing signal;
(e) converting the square wave signals into time function signals whose amplitudes vary with time in accordance with a given mathematical relationship;
(f) comparing the time function signals with a reference signal to produce computed well logging measurements which are representative of the given function of the well logging measurements; and
(g) switching, in synchronism with the step of sampling, the computed well logging measurements to separate utilization means so that each utilization means will receive the computed well logging measurements derived from a separate investigating apparatus.

13. A system for processing measurements of at least one characteristic of earth formations traversed by a borehole wherein different apparatus for investigating the earth formations surrounding the borehole are utilized, comprising:
(a) means for providing well logging measurements from at least two different apparatus for investigating the earth formations surrounding the borehole;
(b) means for generating a timing signal at a given frequency;
(c) sampling means responsive to the timing signal for sampling the well logging measurements from the different investigating apparatus at given intervals of time, the well logging measurements from each different investigating apparatus being sampled during a different interval of time;
(d) means responsive to the timing signal for chopping the sampled well logging measurements into square wave signals;
(e) means for converting the square wave signals into time function signals whose amplitudes vary with time in accordance with a given mathematical relationship;
(f) means for comparing the time function signals with a reference signal to produce computed well logging measurements which are representative of the given function of the well logging measurements;
(g) a separate utilization means adapted to be responsive to the computed well logging measurements corresponding to the measurements derived from the different investigating apparatus; and
(h) first switching means for switching the computed well logging measurements from the computing means to different ones of the utilization means in synchronism with the sampling of the well logging measurements by the sampling means.

14. The system of claim 13 wherein the means for converting the square wave signals into time function signals includes differentiator means for converting the square wave signals to logarithmic function signals so that the computed well logging measurements will represent a logarithmic function of the well logging measurements.

References Cited
UNITED STATES PATENTS

| | | | |
|---|---|---|---|
| 2,600,423 | 6/1952 | Nolle | 328—145 XR |
| 2,742,605 | 4/1956 | McMillan | 324—1 |
| 2,874,347 | 2/1959 | Southwick | 324—1 |
| 2,880,389 | 3/1959 | Ferre et al. | 324—1 |
| 2,884,589 | 4/1959 | Campbell | 324—1 |
| 3,329,889 | 7/1967 | Tanguy | 324—6 XR |
| 2,870,259 | 1/1959 | Norris | 179—15 |
| 3,185,821 | 5/1965 | Lee et al. | 235—150.4 |

RUDOLPH V. ROLINEC, *Primary Examiner.*

G. R. STRECKER, *Assistant Examiner.*